(12) United States Patent
Suvorov et al.

(10) Patent No.: US 9,013,631 B2
(45) Date of Patent: Apr. 21, 2015

(54) METHOD AND APPARATUS FOR PROCESSING AND DISPLAYING MULTIPLE CAPTIONS SUPERIMPOSED ON VIDEO IMAGES

(75) Inventors: Denis Sergeyevich Suvorov, St. Petersburg (RU); Anton S. Korchazhinskiy, St. Petersburg (RU); Irina Spirina, St. Petersburg (RU)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/123,277

(22) PCT Filed: Jun. 22, 2011

(86) PCT No.: PCT/RU2011/000435
§ 371 (c)(1),
(2), (4) Date: Dec. 2, 2013

(87) PCT Pub. No.: WO2012/177160
PCT Pub. Date: Dec. 27, 2012

(65) Prior Publication Data
US 2014/0111688 A1    Apr. 24, 2014

(51) Int. Cl.
*H04N 5/04*    (2006.01)
*H04N 9/44*    (2006.01)
(Continued)

(52) U.S. Cl.
CPC ...... *H04N 21/44016* (2013.01); *H04N 5/44504* (2013.01); *H04N 21/4884* (2013.01);
(Continued)

(58) Field of Classification Search
USPC ......... 348/500, 508, 512, 513, 515, 516, 521, 348/522, 525, 563, 564, 465, 569, 461, 464, 348/468, 495, 719, 734, 565
See application file for complete search history.

(56) References Cited

U.S. PATENT DOCUMENTS 5,508,754 A  *  4/1996  Orphan ..................... 348/722
5,742,352 A  *  4/1998  Tsukagoshi ............... 348/468
(Continued)

FOREIGN PATENT DOCUMENTS

| JP | 2002232798 A | 8/2002 |
| WO | 0232128 A2 | 4/2002 |
| WO | 2007142648 A1 | 12/2007 |

OTHER PUBLICATIONS

Patent Cooperation Treaty, International Search Report and Written Opinion of the International Searching Authority for International Application No. PCT/US2011/000435, Apr. 12, 2012, 14 pages.

*Primary Examiner* — Jefferey Harold
*Assistant Examiner* — Mustafizur Rahman
(74) *Attorney, Agent, or Firm* — Lowenstein Sandler LLP

(57) ABSTRACT

Methods and apparatus for processing and displaying caption information associated with a video program are provided. The caption information is extracted from a video signal and different captions are rendered in sequence for different segments of the video program. A plurality of the different captions is blended in a form for simultaneous display superimposed on video images during one of the different segments of the video program. The different captions may be the latest caption corresponding to the current segment of video and a previous caption corresponding to a previous video segment. These different captions can be displayed such that they overlie each other and such that their opacity is different. In this manner, a viewer is able to have a prolonged period of time to read captions and can readily distinguish the current caption from the previous caption.

20 Claims, 3 Drawing Sheets

(51) Int. Cl.
*H04N 21/44* (2011.01)
*H04N 21/488* (2011.01)
*H04N 21/43* (2011.01)
*H04N 21/431* (2011.01)
*H04N 21/434* (2011.01)
*H04N 5/445* (2011.01)

(52) U.S. Cl.
CPC ....... *H04N21/4307* (2013.01); *H04N 21/4312* (2013.01); *H04N 21/4318* (2013.01); *H04N 21/4302* (2013.01); *H04N 21/4348* (2013.01)

(56) References Cited

U.S. PATENT DOCUMENTS

| | | | |
|---|---|---|---|
| 5,847,770 A * | 12/1998 | Yagasaki | 348/563 |
| 5,848,217 A | 12/1998 | Tsukagoshi et al. | |
| 6,097,442 A * | 8/2000 | Rumreich et al. | 348/563 |
| 6,977,690 B2 * | 12/2005 | Gomikawa | 348/468 |
| 7,050,109 B2 | 5/2006 | Safadi et al. | |
| 7,580,615 B2 | 8/2009 | Huang et al. | |
| 8,508,582 B2 * | 8/2013 | Newton et al. | 348/43 |
| 2003/0020834 A1 * | 1/2003 | Gomikawa | 348/589 |
| 2003/0035063 A1 * | 2/2003 | Orr | 348/465 |
| 2004/0252234 A1 * | 12/2004 | Park | 348/468 |
| 2005/0053359 A1 * | 3/2005 | Jung et al. | 386/95 |
| 2005/0073608 A1 * | 4/2005 | Stone et al. | 348/468 |
| 2005/0191035 A1 | 9/2005 | Jung et al. | |
| 2006/0051053 A1 * | 3/2006 | Tamura | 386/46 |
| 2007/0031122 A1 * | 2/2007 | Yamagata et al. | 386/95 |
| 2008/0095442 A1 * | 4/2008 | Ekin et al. | 382/187 |
| 2008/0158419 A1 * | 7/2008 | Matsuda | 348/468 |
| 2009/0307614 A1 * | 12/2009 | Craig et al. | 715/758 |
| 2010/0020234 A1 | 1/2010 | Smith et al. | |
| 2010/0091187 A1 * | 4/2010 | Topiwalla | 348/468 |
| 2010/0098389 A1 * | 4/2010 | Shimada | 386/52 |
| 2010/0157025 A1 * | 6/2010 | Suh et al. | 348/51 |
| 2010/0225808 A1 | 9/2010 | Mears | |
| 2010/0259676 A1 | 10/2010 | Swan | |
| 2011/0097056 A1 | 4/2011 | Mears | |
| 2011/0111808 A1 | 5/2011 | Fields et al. | |
| 2011/0134213 A1 * | 6/2011 | Tsukagoshi | 348/43 |
| 2011/0187925 A1 * | 8/2011 | Onoda | 348/468 |
| 2011/0227911 A1 * | 9/2011 | Joo et al. | 345/419 |

* cited by examiner

METHOD AND APPARATUS FOR PROCESSING AND DISPLAYING MULTIPLE CAPTIONS SUPERIMPOSED ON VIDEO IMAGES

FIELD

Displaying subtitles, closed captions, or other text or content superimposed on video images in a predetermined sequence during playing of an audiovisual program or media file is described and, more particularly, the manner in which the subtitling, closed captioning, or other text or content is processed and displayed is described.

BACKGROUND

Closed captions and/or subtitles are captions, typically in text form, that are contained in a video signal such as a video signal of a television program, movie, media file, or other audiovisual program. For example, text corresponding to dialogue, sound effects, and the like of an audiovisual program are transmitted with the video and audio information from a broadcaster or like content provider. Recovery of closed captions and subtitles for display along with the video typically requires a decoder or like device that enables the captions to be displayed in proper sequence on the display screen with the video of the program such that the captions or subtitles are temporarily superimposed on the video. The apparatus in which the decoder or like device is implemented, for instance, may include a set-top box, a television, a computer (desktop, laptop, tablet, pad, etc.), a video recorder or player, a hand held cellular telephone, or like electronic media player or device associated with a display.

There are various industry standards and specifications with respect to transmitting and rendering caption and subtitle information for being superimposed on a video. The standards and specifications typically specify how the subtitle/caption information is parsed, synchronized with the video, and positioned on the display screen.

By way of example, the EIA-608 standard is a standard for the delivery of closed captions developed by the Federal Communications Commission (FCC) with assistance from the Electronic Industries Association (EIA) Television Data Systems Subcommittee and is based on the Line 21 system utilizing the DVS-157 standard for carriage format in digital cable systems. The DVS-157 standard is a standard established for the cable industry by the Digital Video Subcommittee (DVS) of the Society of Cable Telecommunications Engineers ("SCTE").

The more recently developed EIA-708 standard utilizes the carriage format specified in the Advanced Television System Committee's (ATSC) A/53 standard for digital video. The EIA-708 standard provides advanced closed caption features for digital television signals at the closed captioning origination device. The EIA-708 features include, but are not limited to, the ability to change certain closed caption features, such as the location of the closed caption display and the size and color of the closed caption text. With respect to standards for subtitles, DVB Subtitle rendering is specified in ETSI 300 743 and ARIB Subtitle rendering is specified in ARIB STD-B24. Similar specifications are provided for various other video formats including DVD and DivX formats.

A problem often experienced by a viewer of a video having subtitles or closed captions is that the subtitles/captions are not always provided in a manner that is convenient to the viewer with respect to readability of the subtitles/captions. For instance, the amount of subtitle/caption text displayed on a screen in a given amount of time varies greatly due to the variation in amount and rate of dialogue in the video and the pace and tempo of the dialogue in any particular scene or segment of the video. Subtitles and captions are displayed only for a limited amount of time before being removed and replaced with the next subtitle/caption in sequence. This is true regardless of the amount and/or rate of dialogue in a given segment of the video and may limit the viewer's ability to fully read each subtitle or closed caption, particularly when the dialogue of a particular segment of the video is intensive. By way of example, a first video segment may contain several long sentences of text in which the caption momentarily flashes on the screen and may be followed by another video segment that may contain very little dialogue, such as a single word. In this case, a viewer may be unable to read the entire caption with respect to the first video segment while having spare time in the following video segment.

SUMMARY

This disclosure describes a method for processing caption information provided with a video program. A caption synchronized for display with a predetermined video segment of the video program is blended with a previous iteration of at least one caption displayed with at least one previous video segment of the video program to form a blend of captions for being superimposed on video images of the predetermined video segment of the video program.

This disclosure also describes a method in which a caption synchronized for display with a predetermined segment of the video program is blended with one or more previous captions synchronized to be displayed with one or more previous segments in sequence of the video program to form a blend of captions. The blend of captions is displayed on a display screen superimposed on video images of the predetermined segment of the video program so that one or more older captions associated with the previous segment or segments of the video program remains on the display screen with a newer caption associated with the video segment being displayed.

This disclosure further describes apparatus, such as a decoder, for processing caption information associated with a video program. The apparatus has a caption display unit for blending a caption synchronized for display with a predetermined segment of the video program with one or more previous captions synchronized to be displayed with one or more previous segments in sequence of the video program to thereby form a blend of captions. The apparatus also includes a display mixer for receiving the blend of captions from the caption display unit and video corresponding to the predetermined segment and for mixing the blend of captions and the video such that the blend of captions is superimposed on the video when displayed. In this manner, the one or more previous captions can be displayed for a prolonged period of time, such as during both the one or more previous segments and predetermined segment of the video program.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

The following embodiment is described below in connection with enhancing and improving the readability of subtitle/closed caption information for a viewer of a video. The subtitles/captions can be rendered according to any of the standards and/or specifications discussed above in compliance with these pre-existing standards and specifications. In addition, this development is not limited to displaying only text, but also may include any other information necessary for the display of closed captions and subtitles including, but not limited to, contextual and graphical information. Further, the embodiment discussed herein is not limited to rendering only traditional closed caption or subtitle information and can be implemented for the display of any type of textual information or other content contained within or associated with a video signal, such as, but not limited to, stock tickers, advertising banners, emergency alert signals, and the like. For purposes of this disclosure, the terms "caption", "captions", "subtitle" and "subtitles" are used generically and interchangeably to refer to closed captions, subtitles and any other type of caption.

Figure 1:
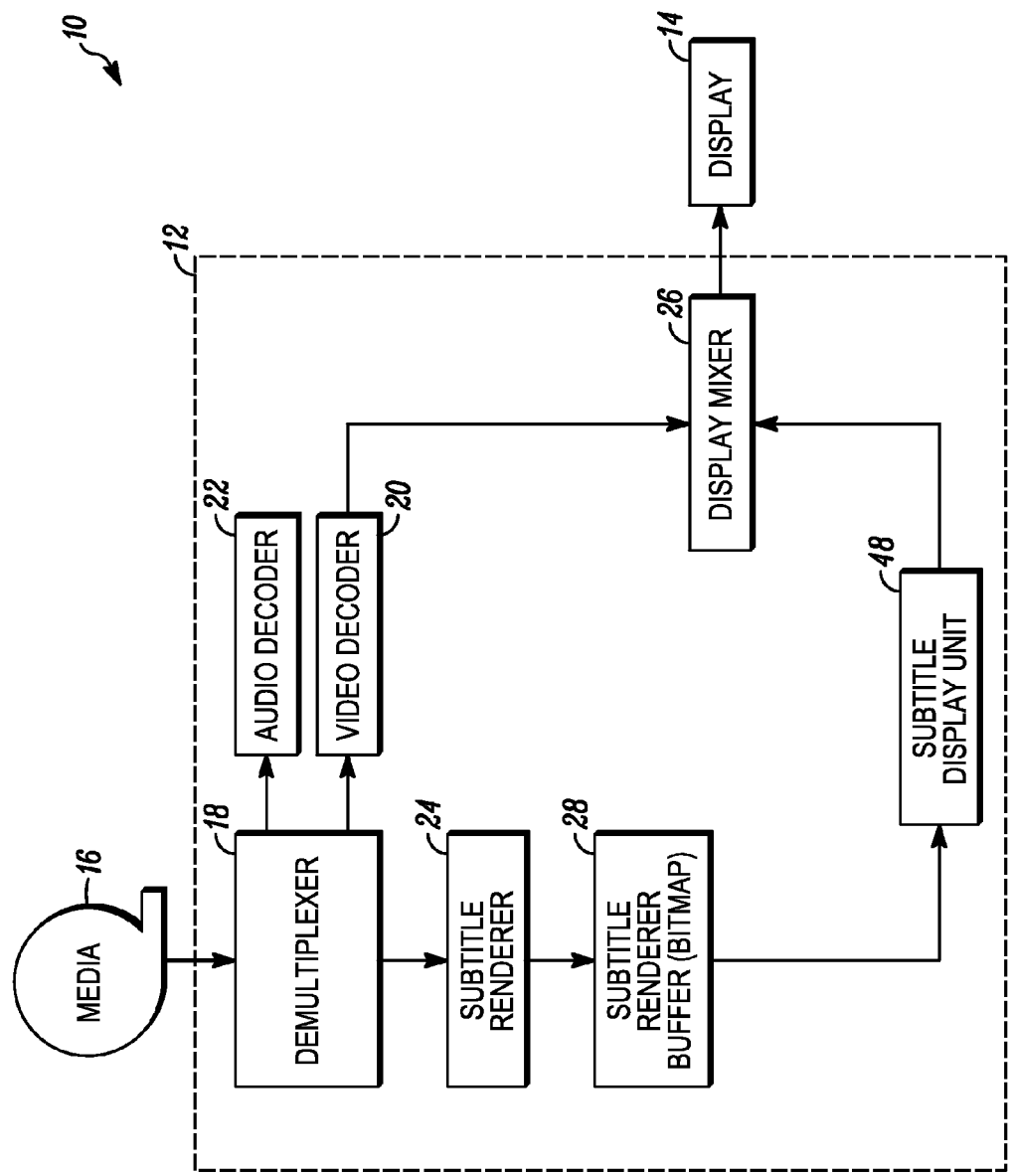
FIG. 1 is a block diagram of a decoder for displaying captions/subtitles superimposed on a video image.

FIG. 1 is a block diagram of a decoder 10 for receiving, extracting, processing, and rendering subtitles or captions such that the subtitles or captions may be superimposed on a video when displayed. The decoder 10 includes a device 12 or portion of a device for receiving a video, audiovisual, media, multimedia or like signal 16 and for rendering caption or subtitle information provided by the signal 16 on an associated display 14 on which a video also provided by the signal 16 can be displayed. For purposes of example, the device 12 can be implemented as part of a set-top box, digital television, personal computer (desktop, laptop, pad or tablet), video recorder, video disk player, cellular telephone, media player, or any other suitable electronic device having or connected to a display on which video can be played and viewed. As an alternative, the device 12 can be implemented as a stand-alone device which receives a television, media or other video signal 16 and is coupled to a separate display 14.

The media signal 16 contains closed caption or subtitle information and an associated video or audiovisual program. The media signal 16 can be provided by a broadcaster or content provider over a network such as a cable, optical, or satellite network, the Internet, or Wi-Fi connection, or can be provided from a stored media file such as from a DVD, video recorder, video player, computer file, or the like. By way of example, the signal 16 can provide any type of video program such as a television show, movie, or the like.

As best shown in FIG. 1, the device 12 for rendering the captions/subtitles can include a demultiplexer 18 or like component able to parse or separate audio and video information provided by the media signal 16 from the caption/subtitle information. The video information can be provided to a video decoder 20 or like component for purposes of displaying or playing the video on the display 14, and the audio can be provided to an audio decoder 22 or like component to enable the audio to be played, if desired, in a manner synchronized with the video.

Likewise, the caption/subtitle information can be provided from the demultiplexer 18 to a caption/subtitle renderer 24 or like component for ultimately providing the desired caption/subtitle to be synchronized and displayed with a particular segment of video. The caption/subtitle desired to be displayed with a particular segment of video is ultimately provided to a display mixer 26 or like component which receives and mixes the decoded video from the video decoder 20 with the synchronized rendered caption/subtitle and forwards this to the display 14 in a manner which enables the desired caption/subtitle to be superimposed on the video image during a segment of the video.

In the embodiment shown in FIG. 1, the device 12 includes a caption/subtitle renderer buffer 28 or like component that receives the latest rendered captions/subtitles from the subtitle renderer 24 and may store a selected number of the latest rendered captions/subtitles in sequence and in a form to be displayed. This may include the current or next caption/subtitle to be displayed and at least one or more captions/subtitles previously displayed in sequence. For purposes of example, see FIG. 2.

Figure 2:
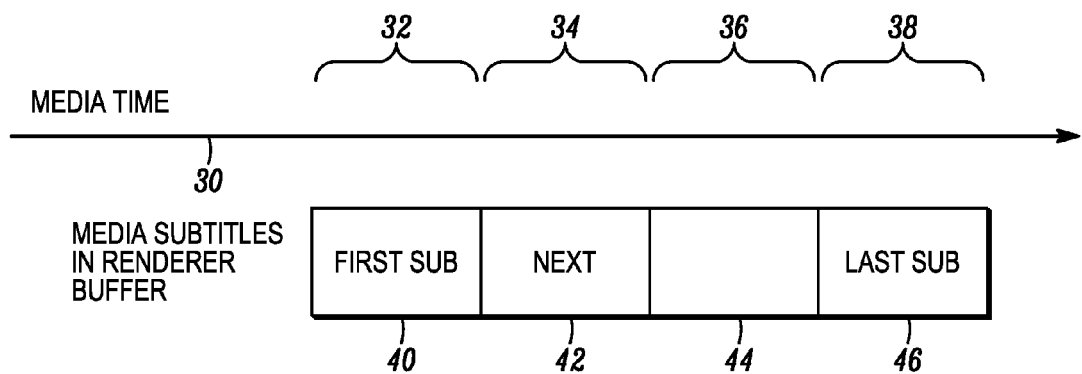
FIG. 2 is an example of a media time lime showing various media subtitles or captions that are to be displayed in sequence and synchronized with a video image.

In FIG. 2, a media time line 30 is shown relative to the playing or playback of a video in which first, second, third and fourth video segments 32, 34, 36 and 38 are defined and played in sequence. There is a different subtitle or caption associated with each segment to be separately and sequentially displayed during each of the video segments 32, 34, 36 and 38. For example, based on conventional practice, the "First sub" text shown in subtitle box 40 in FIG. 2 would be displayed and superimposed on the video image during the playing of the first video segment 32; the "next" text shown in subtitle box 42 would be displayed and superimposed on the video image during the second video segment 34; no caption/subtitle shown in empty subtitle box 44 would be displayed on the video image during the third video segment 36; and the "Last sub" text shown in subtitle box 46 would be displayed and superimposed on the video image during the fourth video segment 38. It should be understood that the words "First sub", "next" and "Last sub" used in the example of FIG. 2 are for explanation purposes only and that this text would likely correspond to the actual words of the dialogue occurring in each of the video segments and, for instance, could include several relatively-long sentences with numerous words. Further, it should be understood that based on conventional practice, the caption/subtitle in each subtitle box 40, 42, 44 and 46 would no longer be displayed at the end of its corresponding video segment 32, 34, 36 and 38 and would be replaced by the caption/subtitle in the next subtitle box in sequence. Thus, none of the subtitle boxes 40, 42, 44 and 46 would appear on the display 14 at the same time based on conventional practice.

The purpose of the buffer 28 is to enable the device 12 to permit the appearance of captions/subtitles, such as those shown in subtitle boxes 40, 42, 44 and 46 of FIG. 2, to be prolonged on the display 14 for a period of time greater than the media or "play" time duration of its corresponding video segment. For example, the caption/subtitle of one video segment can be permitted to remain superimposed on the video during the duration of the next following video segment in sequence. Alternatively, this prolonged appearance of the caption/subtitle can be limited to only a portion of the next video segment, such as the first half of the next video segment, or can be extended for the next two, three, or more video segments. In this manner, the readability of a particularly long subtitle or caption with many words is improved because the viewer is given an extended amount of time to read and/or re-read and obtain a better understanding of the caption without needing to stop and "re-wind" the video.

Accordingly, the device 12 shown in FIG. 1 includes a caption/subtitle display unit 48 or like component that can receive and blend together more than one caption/subtitle corresponding to more than one video segment to be provided to the display mixer 26 for being superimposed on the video image displayed on display 14. By way of example, see the subtitle boxes illustrated in FIGS. 3-6.

Figure 3:
FIG. 3 shows the subtitles/captions in the example of FIG. 2 as displayed during a first segment of video.
Figure 4:
FIG. 4 shows the subtitles/captions in the example of FIG. 2 as displayed during a second segment of video.

The subtitle box 50 shown in FIG. 3 is displayed during the first video segment 32 of the video as described above in connection with the media time line 30 in FIG. 2. Thus, the subtitle display unit 48 provides the caption/subtitle as shown in the subtitle box 50 to the display mixer 26 so that the text "First sub" is superimposed on the video during playing of the first video segment 32. However, during the second video segment 34, the subtitle display unit 32 provides the subtitle box 52 as shown in FIG. 4 to the display mixer 26 so that the text "First sub" of the previous video segment and the text "next" corresponding to the second video segment 34 are simultaneously displayed and superimposed on the video during the second video segment 34. As shown in FIG. 1, the buffer 28 provides the newer or latest caption to be blended with one or more of the older or previous captions currently stored in the subtitle display unit 48.

Accordingly, if a viewer was unable to completely read or desires to re-read the caption/subtitle corresponding to the first video segment 32 due to the length, amount or complexity of the text or limited amount of time of display of the text, the viewer is able to complete reading or re-read the caption/subtitle corresponding to the first video segment 32 during the playing of the second video segment 34. This may be particularly useful when the dialogue in the first video segment 32 is intensive, complex, and/or occurs at a relatively fast pace. Still further, if the dialogue occurring during the second video segment is not as intensive and/or is relatively brief, this provides the viewer with ample time to finish reading and/or re-read the caption/subtitle corresponding to the first video segment during the second video segment since little or no time is needed to read the caption/subtitle associated solely with the second video segment.

Figure 5:
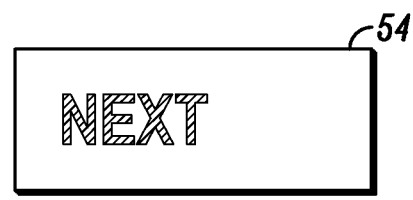
FIG. 5 shows the subtitles/captions in the example of FIG. 2 as displayed during a third segment of video.
Figure 6:
FIG. 6 shows the subtitles/captions in the example of FIG. 2 as displayed during a fourth segment of video.

In FIG. 5, the captions/subtitles corresponding to the second and third video segments, 34 and 36, are displayed as shown in subtitle box 54. Here, the subtitle/caption "First sub" from the first video segment 32 has been deleted and, since there is no subtitle/caption needed for the third video segment 36, only the "next" subtitle/caption corresponding to the second video segment 34 is superimposed on the video image by the display mixer 26 during the third video segment 34. Finally, in FIG. 6, the captions/subtitles corresponding to the third and fourth video segments, 36 and 38, are displayed as shown in subtitle box 56. Here, the subtitle/caption "next" from the second video segment 34 has been deleted and, since there is no subtitle/caption needed for the third video segment 36, only the "Last sub" subtitle/caption corresponding to the fourth video segment 38 is superimposed on the video image during the fourth video segment 38.

Variations of the above referenced example are possible. For example, during the current video segment, the subtitle/caption for the current video segment can be displayed with the subtitle/caption of the previous two or three video segments. As an alternative, the device 12 may determine whether or not the display of a subtitle/caption from a previous video segment in sequence is prolonged based on the length, size or amount of letters, words, etc. of the previous subtitle/caption. Thus, only particularly long subtitle or caption would have the above referenced prolonged display while shorter subtitles or captions may not. Of course, all of the above could be selected and adjusted by way of settings selected by the user.

In addition to the prolonged appearance of subtitles and captions, the buffer 28 and subtitle display unit 48 of device 12 can be used to determine the characteristics of the subtitles and captions as displayed on display 14. For example, the subtitle display unit 48 may display the current subtitle/caption corresponding to the current video segment differently than the subtitle/captions of previous video segments being simultaneously displayed with the current subtitle/caption. In this manner, the viewer can readily appreciate which text being displayed is for dialogue occurring in the current video segment and which text being displayed is for dialogue that occurred in a previous video segment. This difference in appearance could be set or applied in various manners. For instance, any of the font size, font type, font color, caption window position, caption window size, text opacity, background opacity, text justification, background color, and the like could be altered between the different subtitles/captions.

By way of example and according to one contemplated embodiment, the subtitle display unit 48 blends the subtitle/caption display or box of the latest or current subtitle/caption provided by the buffer 28 with at least one older or previous subtitle/caption display or box of the previous video segment in sequence. In this example, the end result is that the blended subtitle/caption box requires only a minimum of display space on the display screen. In addition, the text of the current subtitle/caption can directly or at least partially overlie the text of the previous subtitle/caption. For instance, see FIG. 4 in which the subtitle/caption text "next" and "First sub" overlie each other in subtitle box 52. In this example, the opacity of the subtitle/caption text "next" for the current video segment is greater than the opacity of the subtitle/caption text "First sub" corresponding to the previous video segment. In this manner, the viewer readily appreciates that the darker text "next" corresponds to current dialogue in the video and that the more transparent or lighter text "First sub" corresponds to a subtitle/caption from the previous video segment. Also, see FIG. 5, in which the subtitle/caption text "next" corresponds to dialogue prolonged on the display screen and corresponding to the previous video segment. Here, "next" is shown with reduced opacity in comparison to how it was displayed in FIG. 4 as the current subtitle/caption.

By way of further example, and not by way of limitation, the opacity of the current subtitle or caption can be set to about "1" meaning that it is substantially opaque. In contrast, the opacity of the subtitle or caption having a prolonged display on the next video segment in sequence could have reduced opacity set between about 0.9375 and 0.0625 or between about 0.8 and 0.25, meaning that it appears lighter to the viewer and the underlying video image is viewable through the text. Of course, other settings are possible. For instance, the current or newest subtitle may have opacity of 1, the first previous or older subtitle in sequence may have opacity of 0.5, and the second previous or oldest subtitle in sequence may have opacity of 0.25. To the viewer, the subtitles/captions have prolonged appearance on the video and slowly fade away as they age before completely disappearing from the display.

The above described example is particularly useful when the lengths of the subtitles/captions vary between adjacent video segments. For instance, if there is no current dialogue or subtitle or text, the dialogue from a previous video segment can be easily read and its opacity provides an indication that it relates to past dialogue. In addition, if the current dialogue consists of a short phase or one word, there is very little overlap between the current and previous subtitles/captions enabling the previous subtitle/caption to be easily read.

The above referenced device 12 and method of displaying subtitles and captions enhances the readability of subtitles and captions since it permits subtitles and captions from one or more previous video segments to be read and/or re-read for greater understanding during a subsequent video segment. This extends and prolongs the display of subtitles and captions on the display screen and a characteristic of the different subtitles and captions can be altered based on the age of the subtitle/caption. When opacity is the characteristic altered, this permits the subtitle/caption box to essentially remain the same size and assume the same position on the display screen thereby covering no more of the image than conventional displays of subtitles/captions. Of course, other arrangements of simultaneously displayed subtitles/captions or characteristics could be used to readily distinguish the age of a subtitle/caption relative to another subtitle/caption being displayed.

The device 12 and components thereof discussed above can physically be provided on a circuit board or within an electronic device and can include various modules, processors, microprocessors, controllers, chips, units and the like. It will be apparent to one of ordinary skill in the art that the modules, processors, controllers, units and the like may be implemented as electronic components, software, hardware or a combination of hardware and software.

While the principles of the invention have been described above in connection with specific devices, systems, and methods, it is to be clearly understood that this description is made only by way of example and not as limitation on the scope of the invention as defined in the appended claims.

We claim:

1. A method comprising:
   receiving a media signal comprising a first video segment and a second video segment, the first video segment having an associated first caption and the second video segment having an associated second caption;
   causing the first video segment and the associated first caption to be presented on a display, wherein causing the first video segment and the associated first caption to be presented on the display comprises blending, by a processing device, at least a portion of the first caption with at least a portion of the second caption, wherein the first caption has a first opacity, and wherein the second caption has a second opacity that is different from the second opacity; and
   causing the second video segment to be presented on the display while the first caption continues to be presented on the display.

2. The method of claim 1, wherein the second video segment is to be presented for a display duration, and wherein the first caption is presented during at least some of the display duration.

3. The method of claim 1 further comprising:
   storing the second caption in a buffer; and
   causing the second caption to be presented on the display after the first caption.

4. The method of claim 1, wherein the first caption has a first display characteristic, and wherein the second caption has a second display characteristic that distinguishes the second caption from the first caption.

5. The method of claim 1, wherein the first caption and the second caption are subtitles.

6. A method comprising:
   receiving a media signal comprising a first video segment and a second video segment, the first video segment having an associated first caption and the second video segment having an associated second caption;
   causing the first video segment and the associated first caption to be presented on a display, wherein causing the first video segment and the associated first caption to be presented on the display comprises blending, by a processing device, at least a portion of the first caption with at least a portion of the second caption, wherein the first caption has a first opacity, and wherein the second caption has a second opacity that is different from the second opacity; and
   causing the second caption to be presented on the display while the first video segment continues to be presented on the display.

7. The method of claim 6, wherein the first video segment is to be presented for a display duration, and wherein the second caption is presented during at least some of the display duration.

8. The method of claim 6 further comprising:
   storing the second caption in a buffer; and
   causing the second caption to be presented on the display after the first caption.

9. The method of claim 6, wherein the first caption has a first display characteristic, and wherein the second caption has a second display characteristic that distinguishes the second caption from the first caption.

10. The method of claim 6, wherein the first caption and the second caption are subtitles.

11. An apparatus comprising:
    a buffer; and
    a processing device coupled to the buffer, the processing device to:
      receive a media signal comprising a first video segment and a second video segment, the first video segment having an associated first caption and the second video segment having an associated second caption;
      cause the first video segment and the associated first caption to be presented on a display, wherein causing the first video segment and the associated first caption to be presented on the display comprises blending, by a processing device, at least a portion of the first caption with at least a portion of the second caption, wherein the first caption has a first opacity, and wherein the second caption has a second opacity that is different from the second opacity; and
      cause the second video segment to be presented on the display while the first caption continues to be presented on the display.

12. The apparatus of claim 11, wherein the second video segment is to be presented for a display duration, and wherein the first caption is presented during at least some of the display duration.

13. The apparatus of claim 11, wherein the processing device is further to:
    store the second caption in the buffer; and
    cause the second caption to be presented on the display after the first caption.

14. The apparatus of claim 11, wherein the first caption has a first display characteristic, and wherein the second caption has a second display characteristic that distinguishes the second caption from the first caption.

15. The apparatus of claim 11, wherein the first caption and the second caption are subtitles.

16. A non-transitory computer readable storage medium, having instructions stored therein, which when executed, cause a processing device to perform operations comprising:

receiving a media signal comprising a first video segment and a second video segment, the first video segment having an associated first caption and the second video segment having an associated second caption;

causing the first video segment and the associated first caption to be presented on a display, wherein causing the first video segment and the associated first caption to be presented on the display comprises blending, by a processing device, at least a portion of the first caption with at least a portion of the second caption, wherein the first caption has a first opacity, and wherein the second caption has a second opacity that is different from the second opacity; and causing the second video segment to be presented on the display while the first caption continues to be presented on the display.

17. The non-transitory computer readable storage medium of claim 16, wherein the second video segment is to be presented for a display duration, and wherein the first caption is presented during at least some of the display duration 18. The non-transitory computer readable storage medium of claim 16, the operations further comprising:

storing the second caption in a buffer; and causing the second caption to be presented on the display after the first caption.

19. The non-transitory computer readable storage medium of claim 16, wherein the first caption has a first display characteristic, and wherein the second caption has a second display characteristic that distinguishes the second caption from the first caption.

20. The non-transitory computer readable storage medium of claim 16, wherein the first caption and the second caption are subtitles.

\* \* \* \* \*